United States Patent
Liu et al.

(10) Patent No.: US 9,995,429 B2
(45) Date of Patent: Jun. 12, 2018

(54) FASTENING STRUCTURE BASED ON RATCHET MESH

(71) Applicant: Shenzhen ESUN Display Co., Ltd, Shenzhen (CN)

(72) Inventors: Menglong Liu, Shenzhen (CN); Kaibing Xiang, Shenzhen (CN); Hailong Chen, Shenzhen (CN); Shuxiang Yuan, Shenzhen (CN); Hongchen Zhu, Shenzhen (CN)

(73) Assignee: SHENZHEN ESUN DISPLAY CO., LTD, Shenzhen (CN)

( * ) Notice: Subject to any disclaimer, the term of this patent is extended or adjusted under 35 U.S.C. 154(b) by 219 days.

(21) Appl. No.: 15/208,612

(22) Filed: Jul. 13, 2016

(65) Prior Publication Data

US 2017/0016571 A1    Jan. 19, 2017

(30) Foreign Application Priority Data

Jul. 13, 2015    (CN) ..................... 2015 2 0505899 U

(51) Int. Cl.
*F16M 13/02*    (2006.01)
*F16M 11/06*    (2006.01)

(52) U.S. Cl.
CPC ............ *F16M 13/02* (2013.01); *F16M 11/06* (2013.01); *F16M 2200/024* (2013.01)

(58) Field of Classification Search
CPC .. F16M 13/02; F16M 13/022; F16M 2200/02; F16M 2200/021; F16M 2200/022; F16M 2200/024; F16C 11/10; F16C 11/103; G03B 17/561; Y10T 403/32336; Y10T 403/32344; Y10T 403/32361; Y10T 403/32368; Y10T 403/32254; Y10T 403/32262; Y10T 403/32271; Y10T 403/32278; Y10T 403/32295; Y10T 403/32327; Y10T 403/32409; Y10T 403/32426; Y10T 403/32442; Y10T 403/32451; Y10T 403/32459; Y10T 403/66; Y10T 403/7062; F16B 2/08; F16B 2/06; F16B 2/065; F16B 7/0426
See application file for complete search history.

(56) References Cited

U.S. PATENT DOCUMENTS

| | | | | |
|---|---|---|---|---|
| 3,346,280 A * | 10/1967 | Pfaff, Jr. | ................. | E04H 12/00 248/230.5 |
| 4,175,405 A * | 11/1979 | Smith | .................... | F16D 1/033 403/341 |
| 5,785,447 A * | 7/1998 | Fonti | ................... | E04H 17/1413 248/219.4 |
| 6,575,652 B2 * | 6/2003 | Krauss | ................... | F16D 1/087 248/229.24 |

(Continued)

*Primary Examiner* — Jonathan P Masinick
(74) *Attorney, Agent, or Firm* — Hemisphere Law, PLLC; Zhigang Ma

(57) ABSTRACT

The present invention discloses a fastening structure based on ratchet mesh. The fastening structure includes a ratchet sleeve shaft comprising at least one first ratchet portion set on an outer surface thereof, an adjustable sleeve shaft sleeved in the adjustable sleeve shaft and being rotatable around a central axis thereof, and an elastic ratchet plate separately sleeved on the ratchet sleeve shaft. The elastic ratchet plate includes a second ratchet portion corresponding to the first ratchet portion and at least one end fixed to the adjustable sleeve shaft.

16 Claims, 4 Drawing Sheets

(56) References Cited

U.S. PATENT DOCUMENTS

| | | | | |
|---|---|---|---|---|
| 6,665,331 | B2* | 12/2003 | Chien | F16C 11/0614 372/109 |
| 8,276,854 | B2* | 10/2012 | Mominee | F16L 3/1016 248/62 |
| 8,616,507 | B2* | 12/2013 | Willey | B60J 1/004 24/279 |
| 8,714,860 | B2* | 5/2014 | Cutsforth | F16M 11/10 403/101 |
| 2013/0078027 | A1* | 3/2013 | Hsu | G06F 1/1681 403/113 |
| 2016/0096495 | A1* | 4/2016 | Sasaki | B60K 15/067 248/505 |
| 2016/0186922 | A1* | 6/2016 | Li | F16M 13/02 248/288.11 |

* cited by examiner

FASTENING STRUCTURE BASED ON RATCHET MESH

TECHNICAL FIELD

The present invention relates to mechanical lock, in particular, relates to a fastening structure based on ratchet mesh.

BACKGROUND

Locking/fastening assembly with screwing is usually used in a 3D scanner structure for locking/fixing/fastening something, e.g. cameras, by increasing the friction between the screws and the structure. This locking/fastening assembly is capable of being adjusted in any angle within the scope of activities, but the way of tightening screws to increase friction is high demand to the rigid of the structure. Furthermore, it is needed to repeat tightening and loosing the screws while assembling and detaching the thing, and it's not convenient. In addition, the screw has been easy to be loose during vibration and transportation, so it is very frequent to twist the screws. As time goes on, the screws would be stripped and the locking assembly cannot be tightened, and further affect the performance of the 3D scanner structure.

BRIEF DESCRIPTION OF THE DRAWINGS

In order to illustrate more clearly with prior arts or embodiment of the present invention, the figures needed to be used in the embodiments of the present invention or prior arts will be described briefly in the following section. It is noted that the figures described below only relate to some embodiments of the present invention. For ordinary person skilled in the art, some other drawings according to these drawings can be easily got without paying creative work.

DETAILED DESCRIPTION

To make the objectives, technical solutions, and advantages of the present invention clearer, the present invention is further described in detail in combination with specific embodiments and attached drawings. It should be understood that the embodiments described here are only exemplary ones for illustrating the present invention, and are not intended to limit the present invention.

Figure 1:
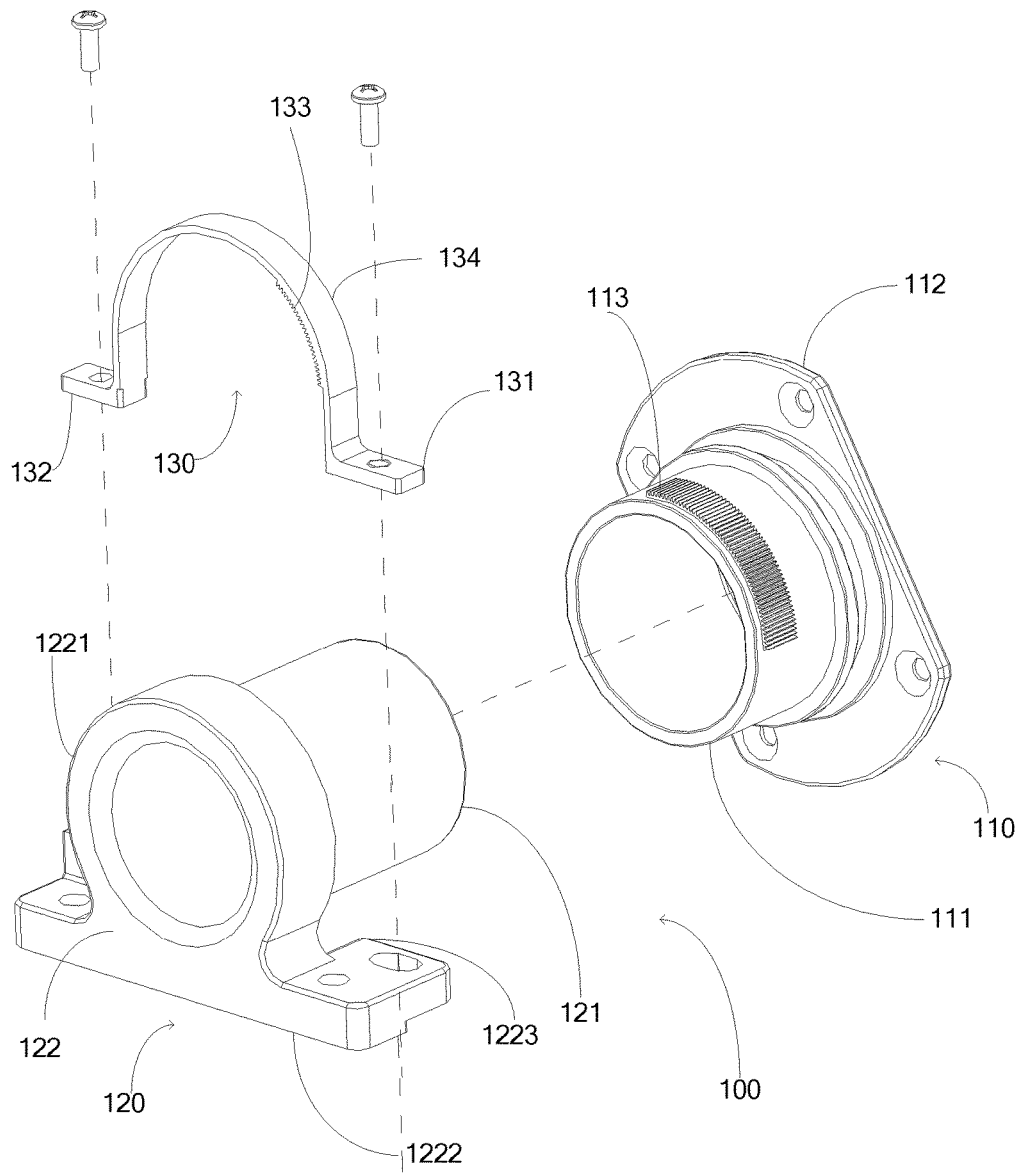
FIG. 1 is an exploded diagram of a fastening structure based on ratchet mesh, according to a first embodiment of the present disclosure.
Figure 2:
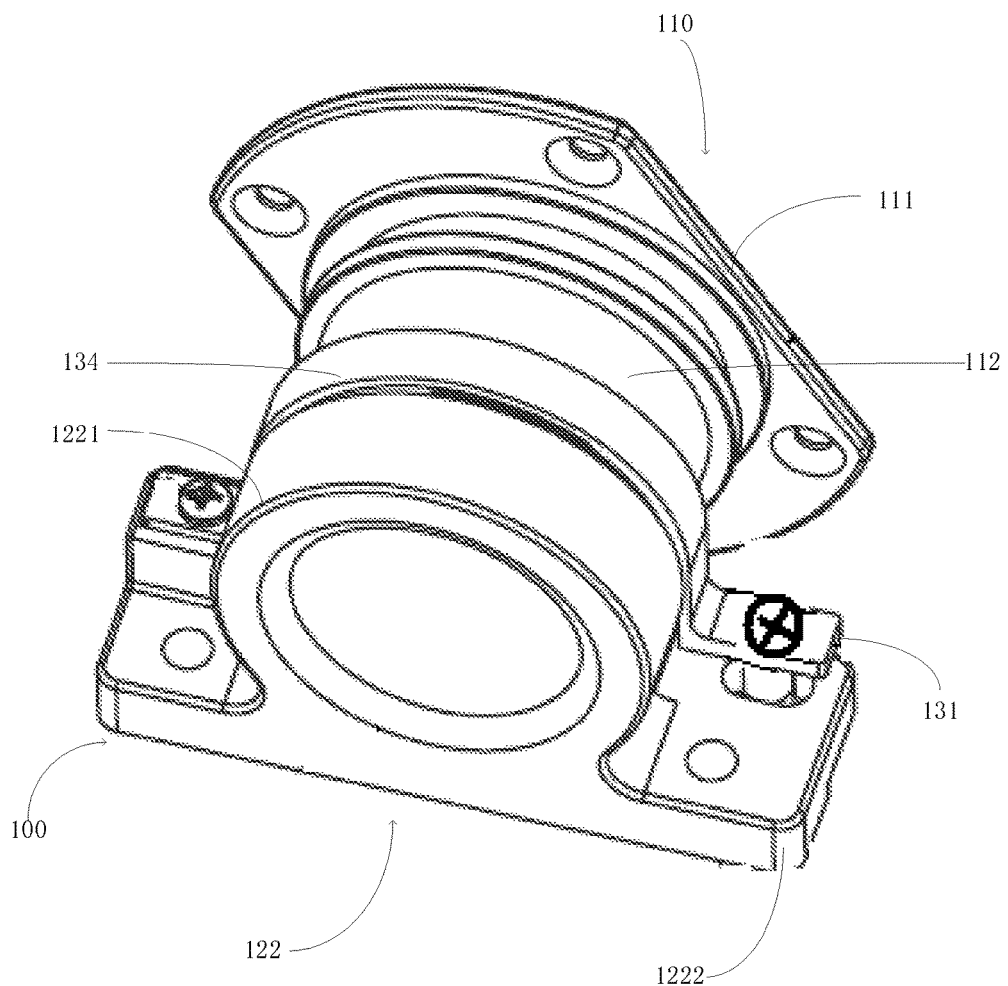
FIG. 2 is an assembled structural diagram of the fastening structure based on ratchet mesh of FIG. 1.

See FIG. 1 and FIG. 2, which are the first disclosure of a fastening structure based on ratchet mesh. In this disclosure, the device 100 includes a ratchet sleeve shaft 110, an adjustable sleeve shaft 120 and an elastic ratchet plate 130. The ratchet sleeve shaft 110 is sleeved on the adjustable sleeve shaft 120. The elastic ratchet plate 130 is separately sleeved on the ratchet sleeve shaft 110 to match each other, and fixed to the adjustable sleeve shaft 120.

Specifically, the ratchet sleeve shaft 110 includes a tube 111, a first base 112 and a first ratchet portion 113. The first base 112 is in connection to the tube 111, and the first ratchet portion 113 is positioned on an outer surface of the tube 111. Multiple thread holes are set on the first base 112, some implements such as a mechanical arm or a camera (figure not shown) or other similar institution is capable of fixing/locking to the first base 112 through screws.

The adjustable sleeve shaft 120 includes a cylinder 121 and a second base 122 supporting the cylinder 121. Specifically, the second base 122 includes a ring portion 1221 and a support 1222 supporting the ring portion 1221. The diameter and the thickness of the ring portion 1221 are similar or same to the tube 111, while the length of the ring portion 1221 is less than the length of the tube 111. The outer diameter of the cylinder 121 is equal to the inner diameter of the ring portion 1221 or that of the tube 111, while the length of the cylinder 121 is less than or equal to the length of the tube 111. Thus, the cylinder 121 can easily insert to the tube 111 and rotate around a central axis thereof. The support 1222 includes an upper surface 1223 facing the ring portion 1221, and the width of the upper surface 1223 is greater than the length of the ring portion 1221.

The elastic ratchet plate 130 is arc-shaped, and includes a first terminal 131, a second terminal 132, a second ratchet portion 132 and an arc portion 134. The height of the arc portion is substantially equal to the diameter of the tube 111, and the second ratchet is set in the inner surface of the arc portion 134. The first and second terminals 131, 132 are extended at the ends of the arc portion 134. The first terminal 131 and the second terminal 132 can separately connect to the support 1222. In this embodiment, screw holes are set at the first terminal 131 and the second terminal 132 for screwing the support 1222.

Due to the length of the cylinder 121 is less than or equal to the length of the tube 111, the tube 111 and the ring portion 1221 match perfectly while the cylinder 121 is receiving in the tube 111. The first ratchet portion 113 is nearby the ring portion 1221, and the first ratchet portion 113 is at least partly projected onto the upper surface 1223 of the second base 122. A plurality of screw holes are set on the upper surface 1223 around the projection area, and the diameter and thread of the screw holes are same to the screw holes in the first terminal 131 and the second terminal 132. The first and second terminal 131, 132 are fixed to the support 1222 by tightening screws in the screw holes. The arc portion 134 is arranged on the tube 111 while the inner surface attaching to the tube 111, and the second ratchet portion 133 meshes with the first ratchet portion 113.

Through screwing down the screws, the first terminal 130 and the second terminal 131 of the elastic ratchet plate 130 are tightened to the support 1222. At the same time, the second ratchet portion 133 meshes with the first ratchet portion 113, and the ratchet sleeve shaft 110 is relatively fastened on the adjustable sleeve shaft 120. Through the use of tools such as a screwdriver, the screws of the terminal 131 and the second terminal 132 are loosed, so that the first terminal 131 or the second terminal 132 can separate from the support 1222, to make the second ratchet portion 133 stripped from the first ratchet portion 113. Consequently, the cylinder 121 can relatively rotate in the tube 111. In the present disclosure, specific mechanical arms or similar institutions (figure not shown) can be respectively fixed to the first base 112 and the second base 122 after finishing the assembling. And, when the second ratchet portion 133 meshes the first ratchet portion 113, they would be relatively fixed and cannot move relatively. When the second ratchet portion 133 is separated from the first ratchet portion 113, the mechanical arms or similar institutions can relatively rotate following the ratchet sleeve shaft 110 and the adjustable sleeve shaft 120, respectively, and the position of each other can be changed in accordance to a predetermined plan.

Differs from known technologies, in the present fastening structure, the ratchet sleeve shaft 110 is set on the adjustable sleeve shaft 120, and the elastic ratchet plate 130 is separable set on the adjustable sleeve shaft 110, as such, the ratchets of the elastic ratchet plate 130 and the ratchets of the ratchet sleeve shaft 110 can be meshed or separated from each other, by adjusting the position of the elastic ratchet plate 130 and the adjustable sleeve shaft 120. With this, the position or angle of the attached mechanical arms or similar institutions can be easily adjusted, without loosing the screws, and increase the effectiveness of the fastening structure.

Figure 3:
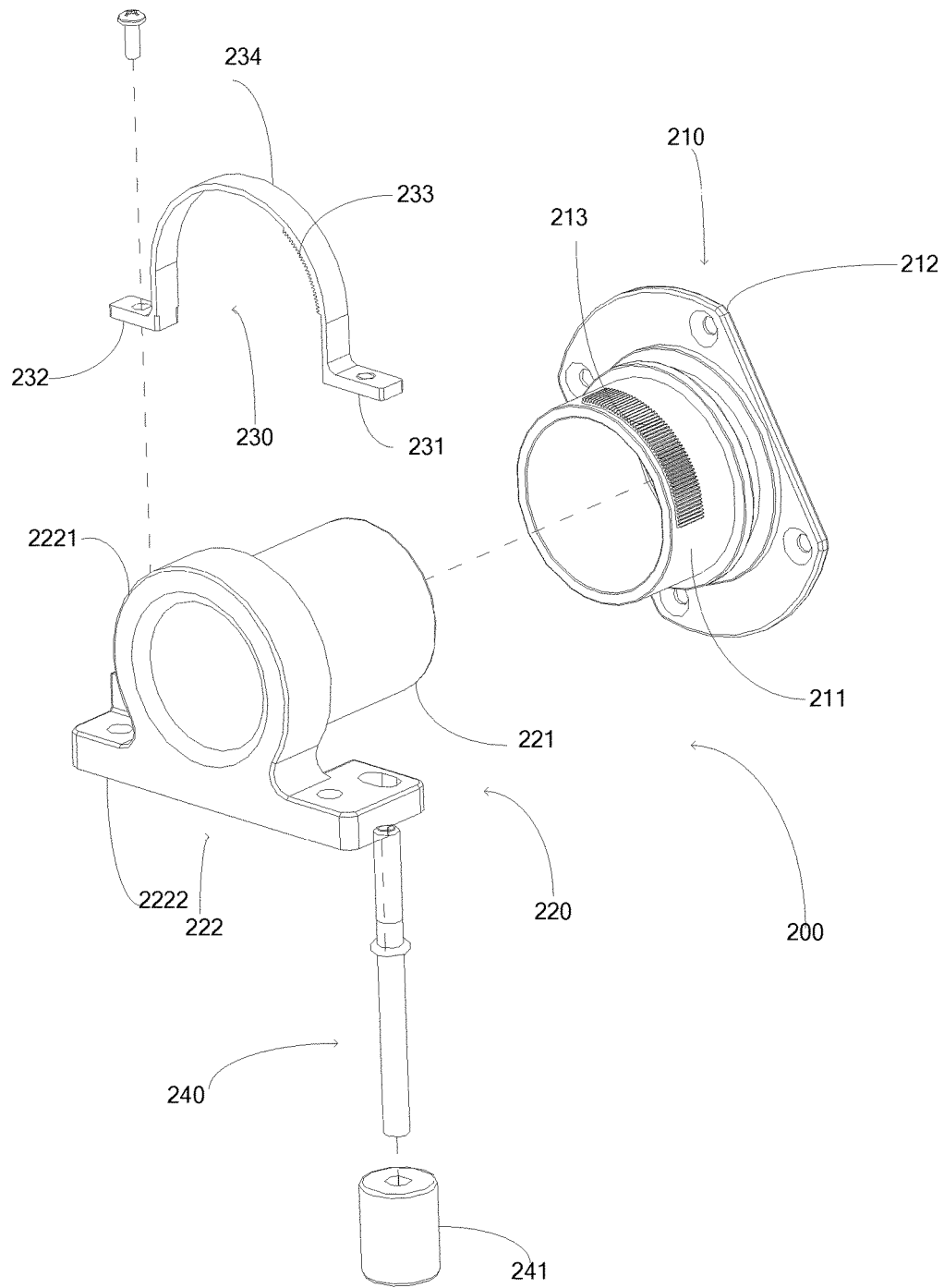
FIG. 3 is an exploded diagram of the fastening structure based on ratchet mesh, according to a second embodiment of the present disclosure.
Figure 4:
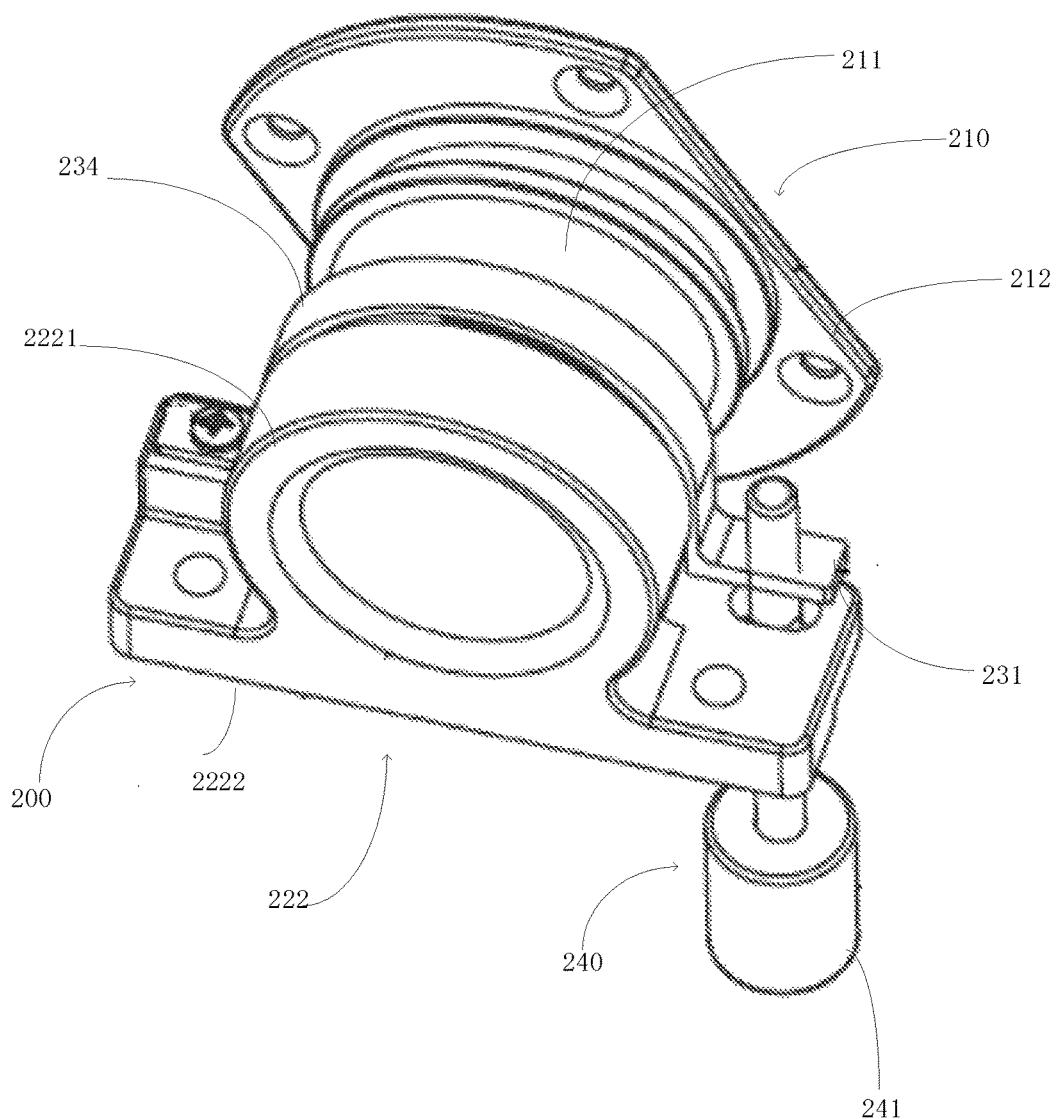
FIG. 4 is an assembled structural diagram of the fastening structure based on ratchet mesh of FIG. 3.

See FIG. 3 and FIG. 4, which are a second disclosure of a fastening structure based on ratchet mesh. The device 200 includes a ratchet sleeve shaft 210, an adjustable sleeve shaft 220, an elastic ratchet plate 230 and an adjustment lever 240. The ratchet sleeve shaft 210 and the elastic ratchet plate 230 are similar with the first embodiment, and would not be repeated here. The shape of the cylinder of the adjustable sleeve shaft 220 is similar to the first embodiment, but it is hollow tubular in this second embodiment. The elastic ratchet plate 230 includes a first terminal 230 and a second terminal 231, one of them is connected to the support 2222 of the second base 222 by screws, and another is detachably connected to the support 2222 by the adjustment lever 240. In this embodiment, the first terminal 231 is detachably connected to the support 2222 by the adjustment lever 240, and the second terminal 232 is connected to the support 2222 by the screws. In another embodiment, the second terminal 232 can be integrated with the support 2222, it is not limited in the present disclosure.

The adjustment lever 240 is rod-shaped, and an end of the rod includes external threads. The external threads cover at least part of the adjustment lever 240. The external threads match to the internal threads in the screw holes of the first terminal 231 and the support 2222. Preferably, an adjustment knob 241 is set on the other end of the adjustment lever 240 without external threads.

Through screwing down the screws, the first terminal 231 of the elastic ratchet plate 230 is tightened to the support 2222 by the adjustment lever 240 and the screws. At the same time, the second ratchet portion 233 meshes with the first ratchet portion 213, and the ratchet sleeve shaft 210 is relatively fastened on the elastic ratchet plate 230, as the ratchet sleeve shaft 210 and the elastic ratchet plate 230 are locked each other, through adjusting the adjustment lever 240. The first terminal 231 separates from the support 2222, thus the second ratchet 233 no longer meshes with the first ratchet portion 213, and the cylinder 221 can relatively rotate in the tube 211. The specific mechanical arms or similar institutions are respectively fixed to the first base 212 and the second base 222. And, when the second ratchet portion 233 meshes with the first ratchet portion 113, they would be relatively fixed and cannot move relatively. When the second ratchet portion 233 is separated from the first ratchet portion 213 by turning the adjustable knob 241, the relative rotation of the mechanical arms can be changed in accordance to a predetermined plan, without using other tools.

Differs from existing technologies, the present fastening structure can adjust separation or meshing of the elastic ratchet plate 230 and adjust the sleeve shaft 220 by the adjustable knob 241 of the adjustment lever 240, so that the ratchets of the elastic ratchet plate 230 and the ratchets of the ratchet sleeve shaft 210 meshing or separation, without using other tools, to adjust the position of the attached load (the mechanical arms or similar institutions). It is more simple and convenient, and can increase the effectiveness of the fastening structure.

Described above are merely preferred embodiments of the present invention, but are not intended to limit the present invention. Any modification, equivalent replacement, or improvement made without departing from the spirit and principle of the present invention should fall within the protection scope of the present invention.

What is claimed is:

1. A fastening structure based on ratchet mesh, comprising:
    a ratchet sleeve shaft, comprising at least one first ratchet portion set on an outer surface thereof;
    an adjustable sleeve shaft sleeved in the ratchet sleeve shaft and being rotatable around a central axis thereof; and
    an elastic ratchet plate separately sleeved on the ratchet sleeve shaft, and comprising a second ratchet portion corresponding to the first ratchet portion and at least one end fixed to the adjustable sleeve shaft.

2. The fastening structure according to claim 1, wherein, the ratchet sleeve shaft further comprises a tube and a first base connected to the tube, the tube is sleeved on the adjustable sleeve shaft, and the first ratchet portion is positioned on an outer surface of the tube.

3. The fastening structure according to claim 2, wherein, the adjustable sleeve shaft comprises a cylinder and a second base supporting the cylinder, the tube of the ratchet sleeve shaft sleeves on the cylinder.

4. The fastening structure according to claim 3, wherein, the second base comprises a ring portion and a support connected to the ring portion, the diameter and the thickness of the ring portion are similar or same to the tube, while the length of the ring portion is less than the length of the tube, the outer diameter of the cylinder is equal to the inner diameter of the ring portion or that of the tube, while the length of the cylinder is less than or equal to the length of the tube.

5. The fastening structure according to claim 4, wherein, the elastic ratchet plate further comprises a first terminal, a second terminal, and an arc portion, the first and second terminals are extended at the ends of the arc portion, the second ratchet portion is set on an inner surface of the arc portion, the height of the arc portion is substantially equal to the diameter of the tube, the first terminal and the second terminal are separately connected to the support of the second base, at least one of the first terminal and the second terminal is fixed to the support.

6. The fastening structure according to claim 5, wherein, one tell final of the elastic ratchet plate is integrated or fixed to the second base by a screw.

7. The fastening structure according to claim 3, wherein, the structure comprises an adjustment lever passing through the second base and the second tell final of the elastic ratchet plate, to lock the elastic ratchet plate on the second base.

8. The fastening structure according to claim 7, wherein, the adjustment lever comprises external threads on one end thereof, and the second base and the elastic ratchet plate comprises screws holes with internal threads, the external thread meshes with the internal threads.

9. The fastening structure according to claim 8, wherein, the adjustment lever is connected to an adjustable knob, the adjustment lever screws in the screw holes by rotating the adjustable knob.

10. A fastening structure based on ratchet mesh, comprising:
  a first sleeve shaft, comprising a tube and a first base connected to the tube, and at least one first ratchet portion is set on an outer surface of the tube;
  a second sleeve shaft, comprising a cylinder and a second base receiving the cylinder, an end of the cylinder is received in the tube of the first sleeve shaft; and
  an elastic ratchet plate, comprising a second ratchet set on an inner surface of the elastic ratchet plate, wherein the second ratchet meshes with the first ratchet portion, and at least one terminal of the elastic ratchet plate is adjustably connected to the second base.

11. The fastening structure according to claim 10, wherein, the second base comprises a ring portion and a support connected to the ring portion, the diameter and the thickness of the ring portion are similar or same to the tube, while the length of the ring portion is less than the length of the tube, the outer diameter of the cylinder is equal to the inner diameter of the ring portion or that of the tube, while the length of the cylinder is less than or equal to the length of the tube.

12. The fastening structure according to claim 11, wherein, the elastic ratchet plate further comprises a first terminal, a second terminal, and an arc portion, the first and second terminals are extended at the ends of the arc portion, the height of the arc portion is substantially equal to the diameter of the tube, the first terminal and the second terminal are separately connected to the support of the second base, at least one of the first terminal and the second terminal is fixed to the support.

13. The fastening structure according to claim 12, wherein, one terminal of the elastic ratchet plate is integrated or fixed to the second base by a screw.

14. The fastening structure according to claim 10, wherein, the structure comprises an adjustment lever passing through the second base and the second terminal of the elastic ratchet plate, to lock the elastic ratchet plate on the second base.

15. The fastening structure according to claim 14, wherein, the adjustment lever comprises external threads on one end thereof, and the second base and the elastic ratchet plate comprises screws holes with internal threads, the external thread meshes with the internal threads.

16. The fastening structure according to claim 14, wherein, the adjustment lever is connected to an adjustable knob, the adjustment lever screws in the screw holes by rotating the adjustable knob.

* * * * *